US011894592B2

(12) United States Patent
Chiba et al.

(10) Patent No.: US 11,894,592 B2
(45) Date of Patent: Feb. 6, 2024

(54) HIGH FREQUENCY FILTER

(71) Applicants: Seiki Chiba, Tokyo (JP); Mikio Waki, Sakura (JP); ZEON CORPORATION, Tokyo (JP)

(72) Inventors: Seiki Chiba, Tokyo (JP); Mikio Waki, Sakura (JP); Keisuke Oguma, Settsu (JP); Shinji Ozawa, Settsu (JP)

(73) Assignees: Selki Chiba, Tokyo (JP); Mikio Waki, Sakura (JP); ZEON CORPORATION, Tokyo (JP)

( * ) Notice: Subject to any disclaimer, the term of this patent is extended or adjusted under 35 U.S.C. 154(b) by 56 days.

(21) Appl. No.: 17/753,556

(22) PCT Filed: Sep. 14, 2020

(86) PCT No.: PCT/JP2020/034638
§ 371 (c)(1),
(2) Date: Mar. 8, 2022

(87) PCT Pub. No.: WO2021/049666
PCT Pub. Date: Mar. 18, 2021

(65) Prior Publication Data
US 2022/0336938 A1 Oct. 20, 2022

(30) Foreign Application Priority Data
Sep. 13, 2019 (JP) ................................ 2019-167328

(51) Int. Cl.
*H01P 1/20* (2006.01)
*H01P 1/205* (2006.01)
(Continued)

(52) U.S. Cl.
CPC .......... *H01P 1/2002* (2013.01); *H01P 1/2053* (2013.01); *H01P 1/225* (2013.01); *H01P 7/04* (2013.01)

(58) Field of Classification Search
CPC .......... H01P 1/2002; H01P 1/20; H01P 1/201; H01P 1/202; H01P 1/205; H01P 1/2053;
(Continued)

(56) References Cited

U.S. PATENT DOCUMENTS

2014/0327499 A1* 11/2014 Park ........................ H01P 1/208
333/203

FOREIGN PATENT DOCUMENTS

EP 2887449 A1 6/2015
JP 2009253944 A 10/2009

OTHER PUBLICATIONS

Nov. 24, 2020, International Search Report issued in the International Patent Application No. PCT/JP2020/034638.

* cited by examiner

*Primary Examiner* — Stephen E. Jones
(74) *Attorney, Agent, or Firm* — KENJA IP LAW PC

(57) ABSTRACT

A high frequency filter A1 has frequency characteristics such that the amount of attenuation for an input electrical signal is smaller in a first frequency band f1 than in a second frequency band f2. The high frequency filter A1 is provided with a dielectric elastomer transducer 1 that includes a dielectric elastomer layer 13 and a pair of electrode layers 14 sandwiching the dielectric elastomer layer 13. The frequency characteristics are variable by the dielectric elastomer transducer 1. This configuration provides a high frequency filter having frequency characteristics that are variable and suitable for a lightweight and compact configuration.

3 Claims, 4 Drawing Sheets

(51) Int. Cl.
*H01P 7/04* (2006.01)
*H01P 1/22* (2006.01)

(58) Field of Classification Search
CPC ........ H01P 1/207; H01P 1/208; H01P 1/2082; H01P 1/2084; H01P 1/2086; H01P 1/22; H01P 1/225; H01P 7/06; H01P 7/04; H01P 7/10; H01P 7/105
See application file for complete search history.

HIGH FREQUENCY FILTER

TECHNICAL FIELD

The present invention relates to high frequency filters.

BACKGROUND ART

Filter circuits are provided in wireless communication systems, for example. Filter circuits may be used to reduce harmonic distortions resulting from power amplifiers (non-linear power amplifiers), for example. Patent document 1 discloses a conventional high frequency filter for a filter circuit. The high frequency filter includes a housing, an input unit, an output unit, a plurality of resonant elements and a plurality of adjusting elements. The plurality of adjusting elements are provided by screws threadably engaged with the housing. The distances from the adjusting elements to the resonant elements can be changed to adjust the capacitive components of the filter circuit or the equivalent circuit of the high frequency filter, thereby changing the frequency characteristics of the high frequency filter. In a system proposed in the above document, motors are used for moving the respective adjusting elements relative to the resonant elements (or to the housing).

PRIOR ART DOCUMENT

Patent Document

Patent Document 1: JP-A-2009-253944

SUMMARY OF THE INVENTION

Problem to be Solved by the Invention

However, the number of motors needs to be increased with the numbers of the resonant elements and the adjusting elements. Since major parts of motors are made of metal, the resulting system can be unacceptably heavy. Also, increasing the number of motors is not desirable for the system to be compact.

The present invention has been conceived in view of the circumstances described above and aims to provide a high frequency filter capable of changing its frequency characteristics and yet suitable for a lightweight and compact configuration.

Means to Solve the Problem

A high frequency filter provided by the present invention has frequency characteristics (adaptive frequencies) such that an amount of attenuation for an input electrical signal is smaller in a first frequency band than in a second frequency band. The high frequency filter includes a dielectric elastomer transducer that includes a dielectric elastomer layer and a pair of electrode layers sandwiching the dielectric elastomer layer. The frequency characteristics are variable by the dielectric elastomer transducer.

In a preferred embodiment of the present invention, the high frequency filter has a capacitive component that determines the frequency characteristics. The capacitive component is variable by a change of a state of the dielectric elastomer transducer.

In a preferred embodiment of the present invention, the high frequency filter has an inductive component that determines the frequency characteristics. The inductive component is variable by a change in a state of the dielectric elastomer transducer.

In a preferred embodiment of the present invention, the high frequency filter includes: a high frequency filter body that includes a metal housing, an input unit, an output unit, a plurality of resonant elements, and a plurality of adjusting elements disposed to face the plurality of resonant elements, respectively; and a plurality of the dielectric elastomer transducers.

In a preferred embodiment of the present invention, the plurality of dielectric elastomer transducers are configured to move the plurality of resonant elements, respectively, relative to the housing.

In a preferred embodiment of the present invention, the plurality of dielectric elastomer transducers are configured to move the plurality of adjusting elements, respectively, relative to the housing.

Advantages of the Invention

The present invention provides a high frequency filter capable of changing its frequency characteristics and yet suitable for a lightweight and compact configuration Other features and advantages of the present invention will be more apparent by reading detailed description given below with reference to the accompanying drawings.

MODE FOR CARRYING OUT THE INVENTION

Preferred embodiments of the present invention will be described below with reference to the drawings.

In the present disclosure, terms such as “first” and “second” preceding items are used simply as labels and not to impose ordinal limitations on the items.

In the present disclosure, the term “high frequency” does not mean that the operation frequencies are limited to a specific frequency band. The high frequency filter of the present disclosure having the configuration described below enables setting the amounts of attenuation over a wide range of frequencies, ranging from about 0.5 MHz, which is used for AM radios, to tens of gigahertz, which is used for millimeter-wave radars.

FIGS. 1 to 4 show an example of a high frequency filter according to the present invention. A high frequency filter A1 of this embodiment includes a plurality of dielectric elastomer transducers 1, an electric circuit device 3 and a filter body 4.

Figure 3:
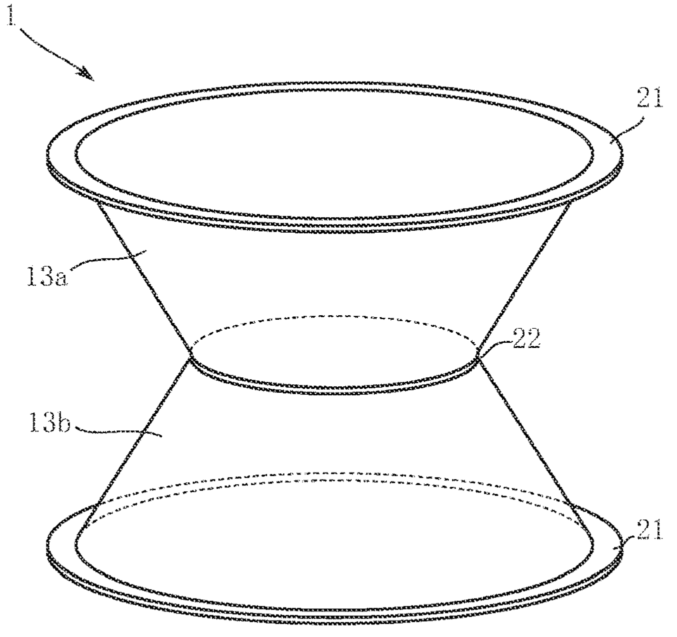
FIG. 3 is a perspective view of a dielectric elastomer transducer of a high frequency filter according to the present invention.
Figure 4:
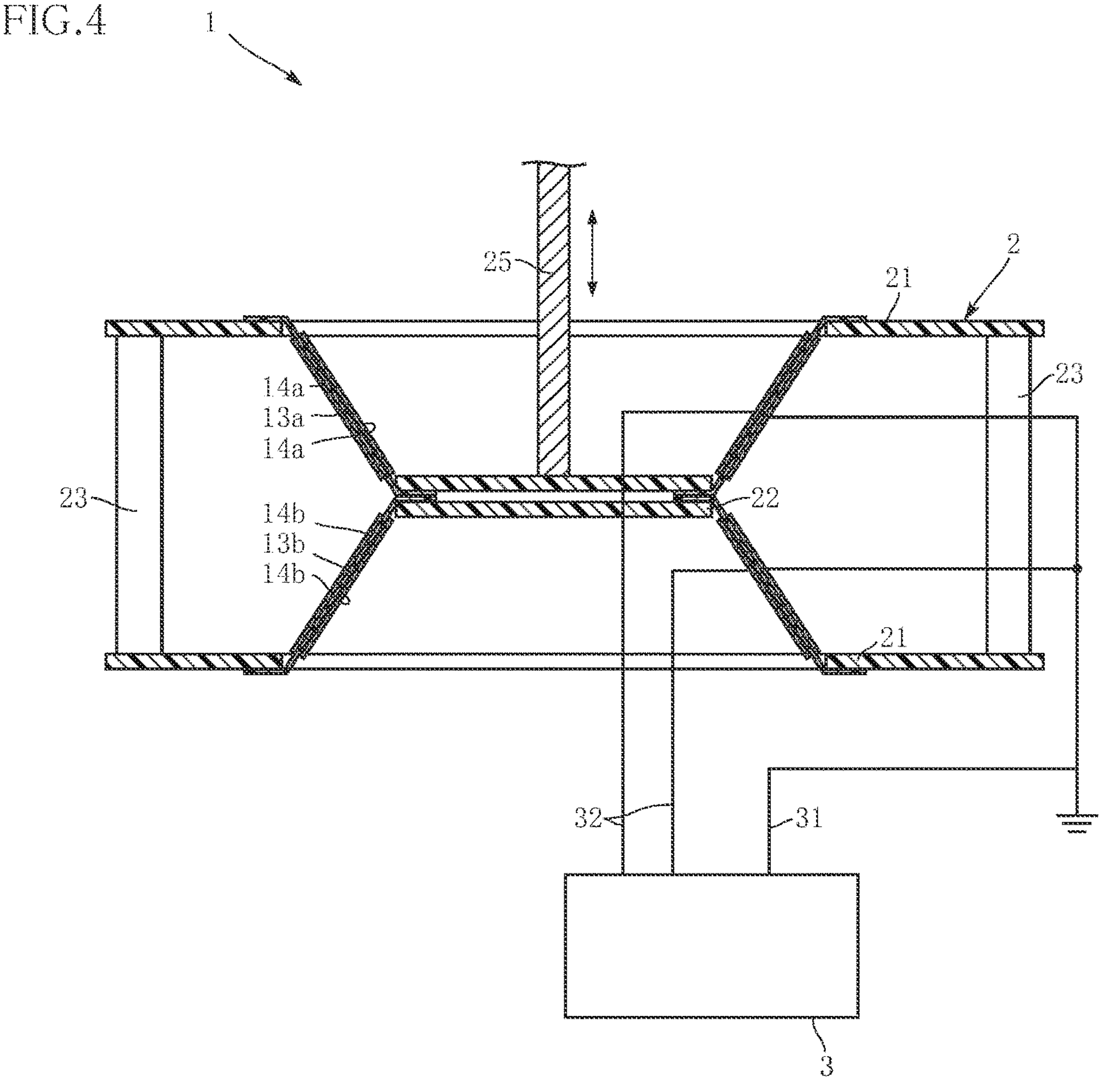
FIG. 4 is a sectional view of a dielectric elastomer transducer of a high frequency filter according to the present invention.

The plurality of dielectric elastomer transducers 1 change their states in response to the electric charge supplied from the electric circuit device 3. In this embodiment, the elastomer transducers 1 act as actuators for changing the frequency characteristics of the filter body 4 as desired. FIGS. 3 and 4 show an example configuration of the dielectric elastomer transducers 1. The dielectric elastomer transducers 1 may have any configuration as long as they are capable of changing the state of the filter body 4 for changing the frequency characteristics. The filter body 4 is not limited to a specific type of filter, and it can be a bandpass filter, a band rejection filter, a high pass filter or a low pass filter, for example.

Each dielectric elastomer transducer 1 includes a plurality of dielectric elastomer layers 13, a plurality of pairs of electrode layers 14 and a support 2.

Preferably, the dielectric elastomer layers 13 are elastically deformable and have a high dielectric strength. Preferable materials for the dielectric elastomer layers 13 include, but not limited to, silicone elastomers, acrylic elastomers and styrene elastomers. The shape of the dielectric elastomer layers 13 is not specifically limited. In this embodiment, each dielectric elastomer layer 13 has an annular shape in plan view, in a state before it is assembled into a dielectric elastomer transducer 1 and thus without any external force applied thereto.

Each pair of electrode layers 14 sandwich a dielectric elastomer layer 13. The electrode layers 14 are made of a conductive material that is electrically deformable to follow elastic deformation of the dielectric elastomer layer 13. For example, such a material may be prepared by mixing conductive fillers into an elastically deformable base material. Preferable examples of the fillers include carbon nanotubes.

In the present embodiment, each dielectric elastomer transducer 1 includes dielectric elastomer layers 13*a* and 13*b*. Additionally, a pair of electrode layers 14*a* are disposed to sandwich the dielectric elastomer layer 13*a*, and a pair of electrode layers 14*b* are disposed to sandwich the dielectric elastomer layer 13*b*.

The support 2 is a component that supports the dielectric elastomer layer 13*a* and the electrode layers 14*b*. In this embodiment, the support 2 mechanically and serially couples the dielectric elastomer layer 13*a* and the electrode layers 14*b*. Specifically, the support 2 includes a pair of support rings 21, a support plate 22 and a plurality of support rods 23. Although the material of the support 2 is not specifically limited, the portions of the support 2 in contact with the dielectric elastomer layers 13*a* and 13*b* are preferably made of an insulating material, such as resin. The configuration of the support 2 described below is simply an example and does not specifically limit the support 2.

The pair of support rings 21 are annular shaped components having relatively large diameter and are spaced apart from each other in a vertical direction as seen in the figure. The outer periphery of the dielectric elastomer layer 13*a* is fixed to the upper support ring 21 as seen in the figure. The outer periphery of the dielectric elastomer layer 13*b* is fixed to the lower support ring 21 as seen in the figure.

The support plate 22 is disposed between the pair of the support rings 21 and has the shape of a circular plate, for example. The inner peripheries of the dielectric elastomer layers 13*a* and 13*b* are fixed to the support plate 22. A connecting member 25 is attached to the support plate 22 for transferring a driving force of the dielectric elastomer transducer 1 to the outside. The connecting member 25 is connected to one resonant element 44 or one adjusting element 45 of the filter body 4, which will be described later in more detail.

The plurality of support rods 23 connect the pair of support rings 21 together. The support rods 23 have such a length that the dielectric elastomer layers 13*a* and 13*b* are sufficiently stretched vertically in the figure, producing a desirable tensile force when no charges are supplied from the electric circuit device 3.

The dielectric elastomer layer 13*a* and the electrode layers 14*b* supported by the support 2 of this configuration define a conical shape having an axis extending in the vertical direction.

The electric circuit device 3 is connected to the pair of electrode layers 14*a* and also to the pair of the electrode layers 14*b*. The electric circuit device 3 includes a drive control circuit. The drive control circuit includes a power supply circuit for producing a voltage across each pair of the electrode layers 14*a* and 14*b* to induce electric charges, and also includes a control circuit for controlling the power supply circuit. The electric circuit device 3 is connected to one of the electrode layers 14*a* and one of the electrode layers 14*b* by a plurality of wirings 32, respectively. The electric circuit device 3 is also connected to the other electrode layer 14*a* and the other electrode layers 14*b* by a plurality of wirings 31, respectively. In the example shown in the figure, the wirings 31 are grounded. As such, while the electric circuit device 3 is connected to the pair of electrode layers 14*a*, it is also connected to the pair of electrode layers 14*b* in a separate manner. This configuration enables the electric circuit device 3 to separately apply electric charges (potential difference) to the respective pairs of electrode layers 14*a*, 14*b*.

For example, when the electric circuit device 3 applies a potential difference across the pair of electrode layers 14*a*, the electrode layers 14*a* are attracted to each other due to the Coulomb force. As a result, the dielectric elastomer layer 13*a* is made thinner and larger in area. In this state, the tensile force of the dielectric elastomer layer 13*a* is reduced, thereby rendering the tensile force of the dielectric elastomer layer 13*b* relatively greater. As a result, the support plate 22 is pulled downward as seen in the figure by the dielectric elastomer layer 13*b*. In this way, the dielectric elastomer transducer 1 produces a driving force that pulls the connecting member 25 downward.

When the potential difference across the pair of electrode layers 14*a* is removed and the electric circuit device 3 applies a potential difference across the pair of electrode layers 14*b*, the electrode layers 14*b* are attracted to each other due to the Coulomb force. As a result, the dielectric elastomer layer 13*b* is made thinner and larger in area. In this state, the tensile force of the dielectric elastomer layer 13*b* is reduced, thereby rendering the tensile force on the dielectric elastomer layer 13*a* relatively greater. As a result, the support plate 22 is pulled upward as seen in the figure by the dielectric elastomer layer 13*a*. In this way, the dielectric elastomer transducer 1 produces a driving force that pulls the connecting member 25 upward.

Figure 2:
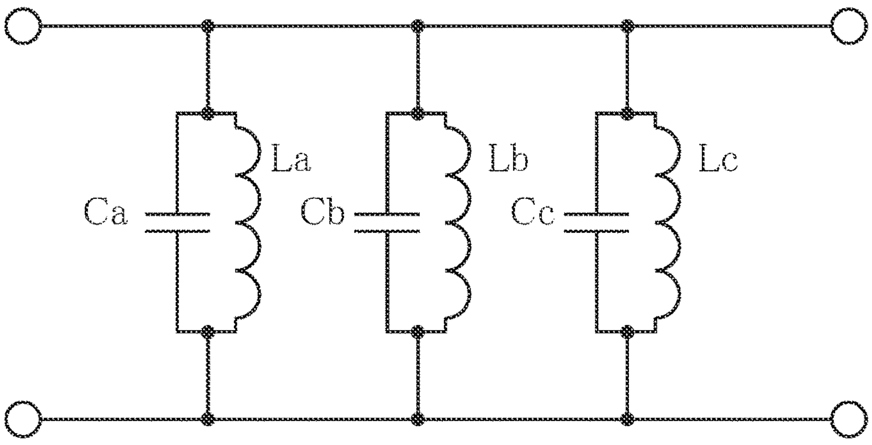
FIG. 2 is an equivalent circuit diagram of an example of a high frequency filter according to the present invention.

The filter body 4 functions as a high frequency filter and is implemented as a filter circuit represented by the equivalent circuit shown in FIG. 2, for example. The filter body 4 has capacitive components Ca, Cb and Cc and inductive components La, Lb and Lc. The LC resonant circuit made up of the capacitive components Ca, Cb, Cc and the inductive components La, Lb, Lc determines the frequency characteristics of the filter body 4 (the high frequency filter A1). It should be noted that the frequency characteristics in accordance with the present invention refers to the characteristics where the amount of attenuation for an input signal is smaller in a first frequency band f1 than in a second frequency band f2.

Figure 1:
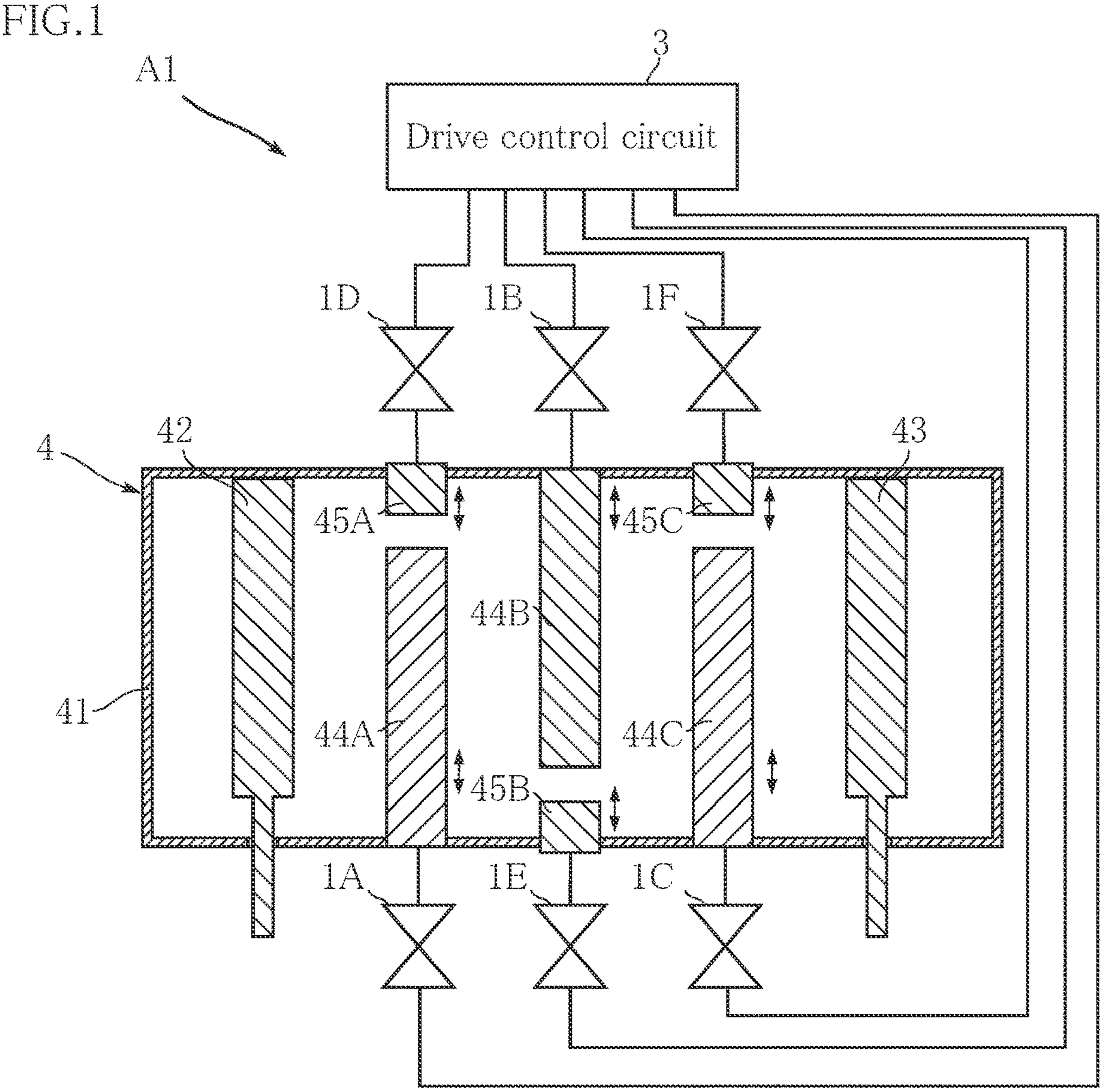
FIG. 1 is a view showing a system configuration of an example of a high frequency filter according to the present invention.

FIG. 1 shows a specific configuration of the filter body 4. The filter body 4 of the present embodiment includes a housing 41, an input unit 42, an output unit 43, a plurality of resonant elements 44 and a plurality of adjusting elements 45.

The housing 41 supports the input unit 42, the output unit 43, the resonant elements 44 and the adjusting elements 45, enclosing at least a portion of each unit and element. The housing 41 is made of metal. The housing 41 is filled with a gaseous matter such as air.

An electrical signal to the filter body 4 is inputted at the input unit 42. An electrical signal from the filter body 4 is outputted from the output unit 43.

The resonant elements 44 are supported to be movable relative to the housing 41. The resonant elements 44 are spaced apart from each other. The resonant elements 44 are made of a conductive material, such as metal.

The adjusting elements 45 are supported be movable relative to the housing 41. The adjusting elements 45 are disposed opposite the respective resonant elements 44. The adjusting elements 45 are made of a conductive material, such as metal.

The numbers of the resonant elements 44 and the adjusting elements 45 are not specifically limited, and suitable numbers of these elements may be provided to achieve the frequency characteristics desired for the filter body 4. In the example shown in the figure, three resonant elements 44 and three adjusting elements 45 are provided. In the following description, the three resonant elements 44 are denoted as the resonant elements 44A, 44B and 44C. Also, the three adjusting elements 45 are denoted as the adjusting elements 45A, 45B and 45C.

The capacitive component Ca of the equivalent circuit is determined by the distance between the resonant element 44A and the adjusting element 45A. The inductive component La is determined by the length of the resonant element 44A. The capacitive component Cb is determined by the distance between the resonant element 44B and the adjusting element 45B. The inductive component Lb is determined by the length of the resonant element 44B. The capacitive component Cc is determined by the distance between the resonant element 44C and the adjusting element 45C. The inductive component Lc is determined by the length of the resonant element 44C.

In the present embodiment, the high frequency filter A1 includes six dielectric elastomer transducers 1. In the following description, the six dielectric elastomer transducers 1 are denoted as the dielectric elastomer transducers 1A, 1B, 1C, 1D, 1E and 1F.

The connecting member 25 of the dielectric elastomer transducer 1A is connected to the resonant element 44A. The connecting member 25 of the dielectric elastomer transducer 1B is connected to the resonant element 44B. The connecting member 25 of the dielectric elastomer transducer 1C is connected to the resonant element 44C. The connecting member 25 of the dielectric elastomer transducer 1D is connected to the adjusting element 45A. The connecting member 25 of the dielectric elastomer transducer 1E is connected to the adjusting element 45B. The connecting member 25 of the dielectric elastomer transducer 1F is connected to the adjusting element 45C.

By actuating the dielectric elastomer transducer LA, the resonant element 44A is moved relative to the housing 41. This consequently changes the inductive component La of the equivalent circuit of the filter body 4. Similarly, by actuating the dielectric elastomer transducer 1B, the resonant element 44B is moved relative to the housing 41, thereby changing the inductive component Lb of the equivalent circuit of the filter body 4. by actuating the dielectric elastomer transducer 1C, the resonant element 44C is moved relative to the housing 41, thereby changing the inductive component Lc of the equivalent circuit of the filter body 4.

By actuating the dielectric elastomer transducer 1D, the adjusting element 45A is moved relative to the housing 41 (to the resonant element 44A), thereby changing the capacitive component Ca of the equivalent circuit of the filter body 4. Similarly, by actuating the dielectric elastomer transducer 1E, the adjusting element 45B is moved relative to the housing 41 (to the resonant element 44B), thereby changing the capacitive component Cb of the equivalent circuit of the filter body 4. By actuating the dielectric elastomer transducer 1F, the adjusting element 45C is moved relative to the housing 41 (to the resonant element 44C), thereby changing the capacitive component Cc of the equivalent circuit of the filter body 4.

Figure 5:
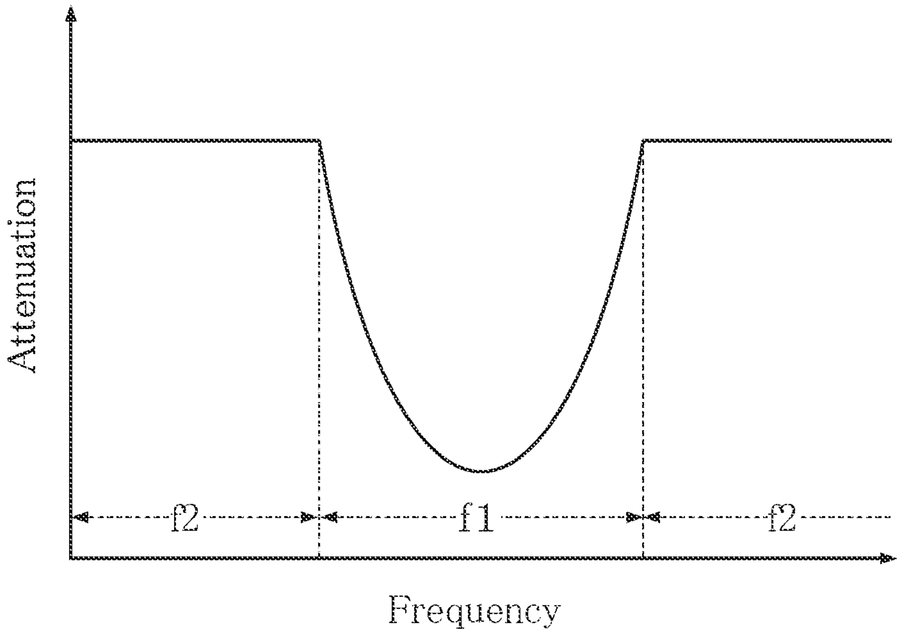
FIG. 5 is a graph of an example of frequency characteristics of a high frequency filter according to the present invention.

FIG. 5 shows an example of the frequency characteristics of the filter body 4 (the high frequency filter A1). As shown in the figure, the filter body 4 (the high frequency filter A1) has frequency characteristics such that the amount of attenuation is smaller in the first frequency band f1 than in the second frequency band f2. In the example shown in the figure, the second frequency band f2 includes two separate ranges of frequencies. The first frequency band f1 is located between the two ranges of the second frequency band f2. The high frequency filter A1 having such characteristics may be referred to as a bandpass filter.

The following describes operations of the high frequency filter A1.

According to the present embodiment, the frequency characteristics of the high frequency filter A1 can be changed by actuating the plurality of dielectric elastomer transducers 1. The dielectric elastomer transducers 1 do not require metallic parts, such as those used in motors, for example. Therefore, the high frequency filter A1, in spite of including the plurality of dielectric elastomer transducers 1, can be lightweight and compact.

In addition, by using the dielectric elastomer transducers 1, the resonant elements 44 and/or the adjusting elements 45 can be moved relative to each other to a greater extent as compared to the relative movement of screws as the adjusting elements 45 relative to the housing 41. This means that the frequency characteristics of the high frequency filter A1 can be changed more significantly.

In a variation of the high frequency filter A1, the filter body 4 shown in FIG. 1 may additionally include a pair of side-notch elements disposed to have the input unit 42 and the output unit 43 in between, and also include another pair of dielectric elastomer transducers 1 for changing the lengths of the side-notch elements. By changing the lengths of the side-notch elements, greater flexibility is achieved in setting the adaptive frequencies, attenuations and adaptive bandwidths.

Figure 6:
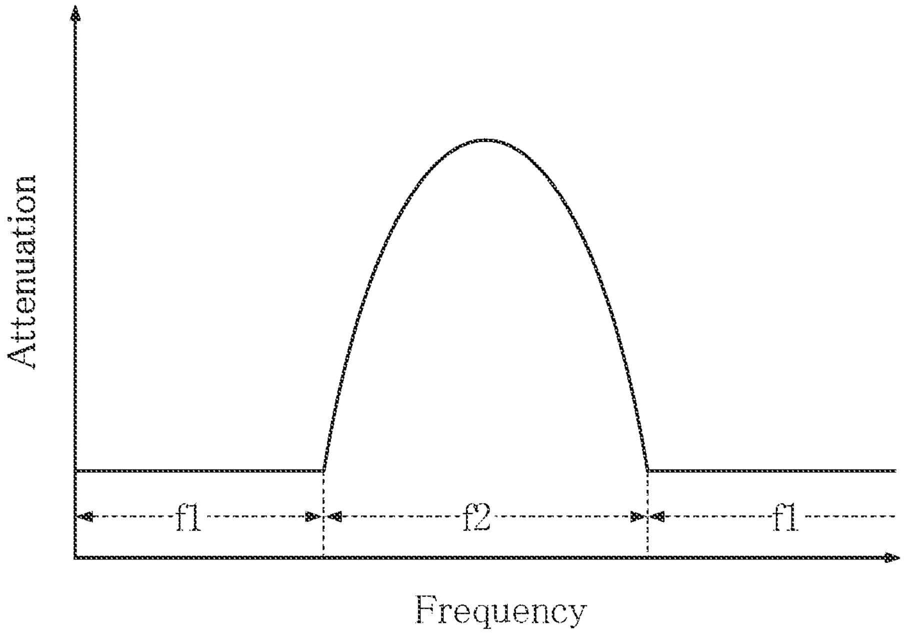
FIG. 6 is a graph of another example of frequency characteristics of a high frequency filter according to the present invention.
Figure 7:
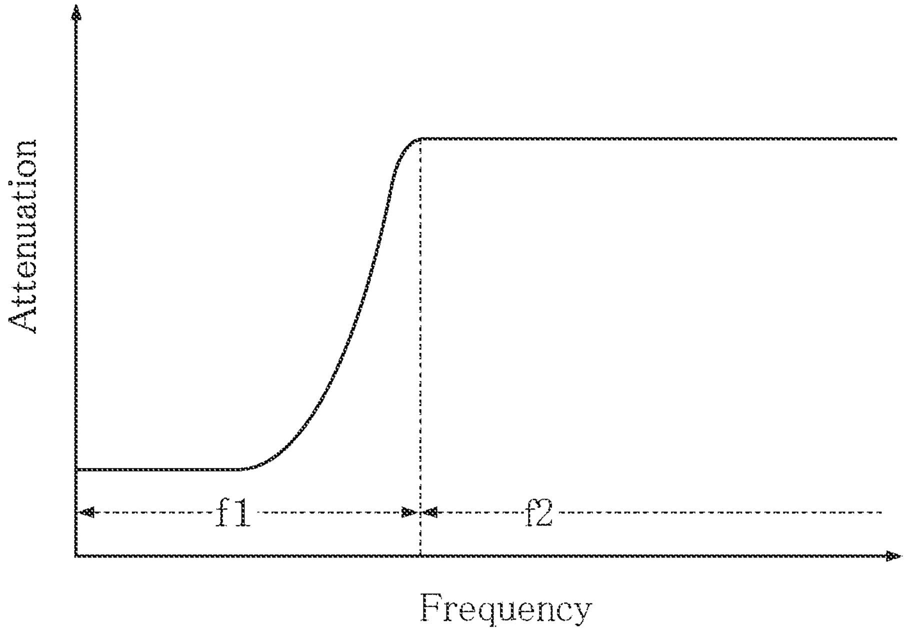
FIG. 7 is a graph of a yet another example of frequency characteristics of a high frequency filter according to the present invention.
Figure 8:
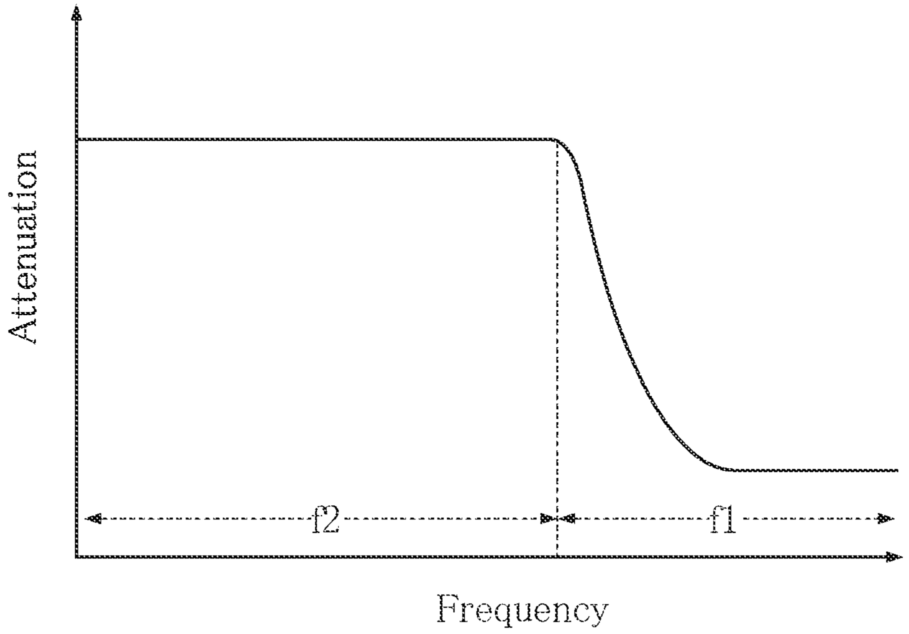
FIG. 8 is a graph of a yet another example of frequency characteristics of a high frequency filter according to the present invention.

FIGS. 6 to 8 show other examples of the frequency characteristics of the filter body 4. In the example shown in FIG. 6, the first frequency band f1 includes two separate ranges of frequencies. The second frequency band f2 is located between the two ranges of the first frequency band f1. The high frequency filter A1 having such characteristics may be referred to as a band rejection filter. In the example shown in FIG. 7, the first frequency band f1 covers lower frequencies than the second frequency band f2. The high frequency filter A1 having such frequency characteristics may be referred to as a low pass filter. In the example shown in FIG. 8, the first frequency band f1 covers higher frequencies than the second frequency band f2. The high frequency filter A1 having such frequency characteristics may be referred to as a high pass filter. The filter body 4 can be adjusted to achieve these frequency characteristics by adopting a suitably selected conventionally known configuration. In any case, the frequency characteristics of the filter body 4 are variable by configuring the capacitive components and the inductive components of the filter body 4 to be variable depending on the states of the dielectric elastomer transducers.

The high frequency filter according to the present invention is not limited to the embodiments described above. Various design changes may be made to the specific configuration of each element of the high frequency filter of the present invention.

The invention claimed is:

1. A high frequency filter comprising:

a high frequency filter body that includes a metal housing, an input unit, an output unit, a plurality of resonant elements, and a plurality of adjusting elements disposed to face the plurality of resonant elements, respectively;

frequency characteristics such that an amount of attenuation for an input electrical signal is smaller in a first frequency band than in a second frequency band; and a plurality of dielectric elastomer transducers, each including a dielectric elastomer layer and a pair of electrode layers sandwiching the dielectric elastomer layer, wherein any one of the dielectric elastomer transducers is configured to vary the frequency characteristics, wherein the plurality of dielectric elastomer transducers are configured to move the plurality of resonant elements, respectively, relative to the metal housing, and wherein the plurality of dielectric elastomer transducers are configured to move the plurality of adjusting elements, respectively, relative to the metal housing.

2. The high frequency filter according to claim 1, further comprising a capacitive component determining the frequency characteristics, wherein any one of the dielectric elastomer transducers is configured to change a state thereof, thereby varying the capacitive component.

3. The high frequency filter according to claim 1, further comprising an inductive component determining the frequency characteristics, wherein any one of the dielectric elastomer transducers is configured to change a state thereof, thereby varying the inductive component.

* * * * *